US009571683B2

(12) United States Patent
Higashimura et al.

(10) Patent No.: US 9,571,683 B2
(45) Date of Patent: Feb. 14, 2017

(54) IMAGE FORMING APPARATUS HAVING A SENSING PORTION TO SENSE DEPRESSION BY PAPER FEED UNIT

(71) Applicant: Konica Minolta, Inc., Chiyoda-ku, Tokyo (JP)

(72) Inventors: Hideji Higashimura, Toyokawa (JP); Yoshitada Ichikawa, Okazaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/006,469

(22) Filed: Jan. 26, 2016

(65) Prior Publication Data

US 2016/0227060 A1   Aug. 4, 2016

(30) Foreign Application Priority Data

Jan. 30, 2015  (JP) .................................. 2015-017331

(51) Int. Cl.
*H04N 1/00* (2006.01)
*B65H 1/26* (2006.01)
*B65H 7/02* (2006.01)

(52) U.S. Cl.
CPC .......... *H04N 1/00694* (2013.01); *B65H 1/266* (2013.01); *B65H 7/02* (2013.01); *H04N 1/0032* (2013.01); *H04N 1/00732* (2013.01); *H04N 2201/0091* (2013.01)

(58) Field of Classification Search
USPC ......................................... 358/1.5, 1.12, 498
See application file for complete search history.

(56) References Cited

U.S. PATENT DOCUMENTS

2009/0256308 A1* 10/2009 Kazama ................... B65H 7/02
271/226
2013/0273788 A1* 10/2013 Fujita ..................... H01R 13/04
439/884

FOREIGN PATENT DOCUMENTS

JP        06298379 A    10/1994
JP        2008059845 A   3/2008

* cited by examiner

*Primary Examiner* — Marcellus Augustin
(74) *Attorney, Agent, or Firm* — Cantor Colburn LLP

(57) ABSTRACT

An image formation apparatus includes, in an apparatus body, a sensing portion which senses presence or absence of depression by a paper feed unit. The sensing portion includes a slider provided to be slidingly movable along a mounting direction of the paper feed unit, a push switch arranged behind the slider along the mounting direction, and a first elastic body and a second elastic body for elastically biasing the slider toward a direction away from the push switch. The first elastic body is interposed between the slider and a portion which does not relatively move with respect to the apparatus body, and the second elastic body is interposed between the slider and a switch portion of the push switch.

7 Claims, 4 Drawing Sheets

IMAGE FORMING APPARATUS HAVING A SENSING PORTION TO SENSE DEPRESSION BY PAPER FEED UNIT

CROSS REFERENCE TO RELATED APPLICATIONS

This application is based on Japanese Patent Application No. 2015-017331 filed with the Japan Patent Office on Jan. 30, 2015, the entire content of which is hereby incorporated by reference.

BACKGROUND OF THE INVENTION

Field of the Invention

The present invention relates to an image formation apparatus including a paper feed unit such as a paper feed tray and a paper feed cassette. In particular, the present invention relates to an image formation apparatus such as a copying machine, a printer, a facsimile, or the like provided with an image formation portion which forms an image utilizing an electrophotographic system, irrespective of the type such as color/monochrome images.

Description of the Related Art

Conventionally, an image formation apparatus in which a paper feed unit for housing paper of various sizes is detachably provided to an apparatus body has been known. In such an image formation apparatus, a detection portion for detecting the size of paper housed in the paper feed unit is generally provided to the apparatus body, and in that case, a detection portion using a push switch is often utilized.

For example, Japanese Laid-Open Patent Publication No. 06-298379 discloses an image formation apparatus in which an apparatus body is provided with a plurality of push switches, and a paper feed tray is provided with an operation portion that can be operated by a user in accordance with housed paper, and a switch depression portion that can adopt states indicating a plurality of different codes in cooperation with an operation in the operation portion. The image formation apparatus is configured such that each of the codes is obtained by mounting the paper feed tray on the apparatus body and thereby sensing presence or absence of depression on each of the plurality of push switches, and based on the code, paper size and the like can be detected in a detection portion.

On the other hand, Japanese Laid-Open Patent Publication No. 2008-59845 discloses a sensing module using a push switch, which is applicable to various kinds of electronic devices, wherein a push button is arranged in front of a switch portion of the push switch. In the sensing module, the push button is provided to be slidingly movable along a depression direction of the switch portion of the push switch, and an elastic body which elastically biases the push button toward a direction away from the push switch is arranged. Thereby, the sensing module is configured such that, when the push button is depressed, the switch portion of the push switch is turned on, and when depression of the push button is released, the push button returns to an origin position based on the elastic biasing force (that is, restoring force) of the elastic body, and thus the switch portion of the push switch is turned off.

SUMMARY OF THE INVENTION

Here, for example in a case where a sensing module as disclosed in Japanese Laid-Open Patent Publication No. 2008-59845 described above is utilized in the image formation apparatus disclosed in Japanese Laid-Open Patent Publication No. 06-298379 described above, as the detection portion described above, there is a possibility that, when the paper feed tray is mounted on the apparatus body, presence or absence of depression of the push switch cannot be stably sensed (that is, erroneous sensing may occur). This is because, due to dimensional tolerances of various components constituting the image formation apparatus, variations in the accuracy of positions of assembling these components, and the like, there occur variations in the amount of depression on the switch portion of the push switch, among individual products.

If such erroneous sensing occurs, it becomes impossible to stably feed paper in the image formation apparatus, and so-called paper jam occurs.

Further, a switch portion of a commercially available push switch is often configured to have a relatively small (narrow) movable stroke, in response to the demand for small-sized apparatuses. Accordingly, when such a push switch is utilized with no change, the erroneous sensing described above is likely to occur, and in addition, the push switch may be broken due to the variations in the amount of depression (that is, the push switch may be broken due to an excessive amount of depression).

Therefore, the present invention has been made to solve the aforementioned problem, and one object of the present invention is to provide an image formation apparatus configured to be able to stably sense presence or absence of depression of a switch portion of a push switch when a paper feed unit is mounted on an apparatus body, and thereby to be able to achieve a stable operation.

In order to achieve the object described above, an image formation apparatus reflecting one aspect of the present invention includes an apparatus body which includes an image formation portion forming an image on paper and a paper feed portion feeding the paper to the image formation portion, a paper feed unit which is detachably provided to the paper feed portion and houses paper to be fed to the image formation portion, and a sensing portion which is provided to the apparatus body and senses presence or absence of depression by the paper feed unit. The sensing portion includes a slider, a push switch, a first elastic body, and a second elastic body. The slider is a member which is provided to be slidingly movable along a mounting direction of the paper feed unit, and recedes along the mounting direction when the paper feed unit contacts the slider. The push switch is arranged behind the slider along the mounting direction. The first elastic body is a member arranged to be interposed between the slider and a portion which does not relatively move with respect to the apparatus body, for elastically biasing the slider toward a direction away from the push switch. The second elastic body is a member arranged to be interposed between the slider and a switch portion of the push switch, for elastically biasing the slider toward the direction away from the push switch.

Preferably, in the image formation apparatus, an elastic biasing force of the second elastic body is greater than an elastic biasing force of the first elastic body.

Preferably, in the image formation apparatus, the push switch has a third elastic body for elastically biasing the switch portion toward the slider. In that case, an elastic biasing force of the second elastic body is preferably greater than an elastic biasing force of the third elastic body.

Preferably, in the image formation apparatus, the sensing portion further includes a coupling member arranged between the switch portion and the slider to cover a tip of the switch portion. In that case, the second elastic body is preferably arranged between the coupling member and the slider.

Preferably, in the image formation apparatus, a gap is provided between the switch portion and the coupling member, in a state where the paper feed unit is removed from the apparatus body.

Preferably, in the image formation apparatus, each of the first elastic body and the second elastic body is formed of a cylindrical member. In that case, the second elastic body is preferably housed inside the first elastic body.

Preferably, in the image formation apparatus, a plurality of the sensing portions are provided to the apparatus body. In that case, in the image formation apparatus, the type of the paper housed in the paper feed unit is preferably detected based on combination of presence or absence of depression in each of the plurality of sensing portions.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
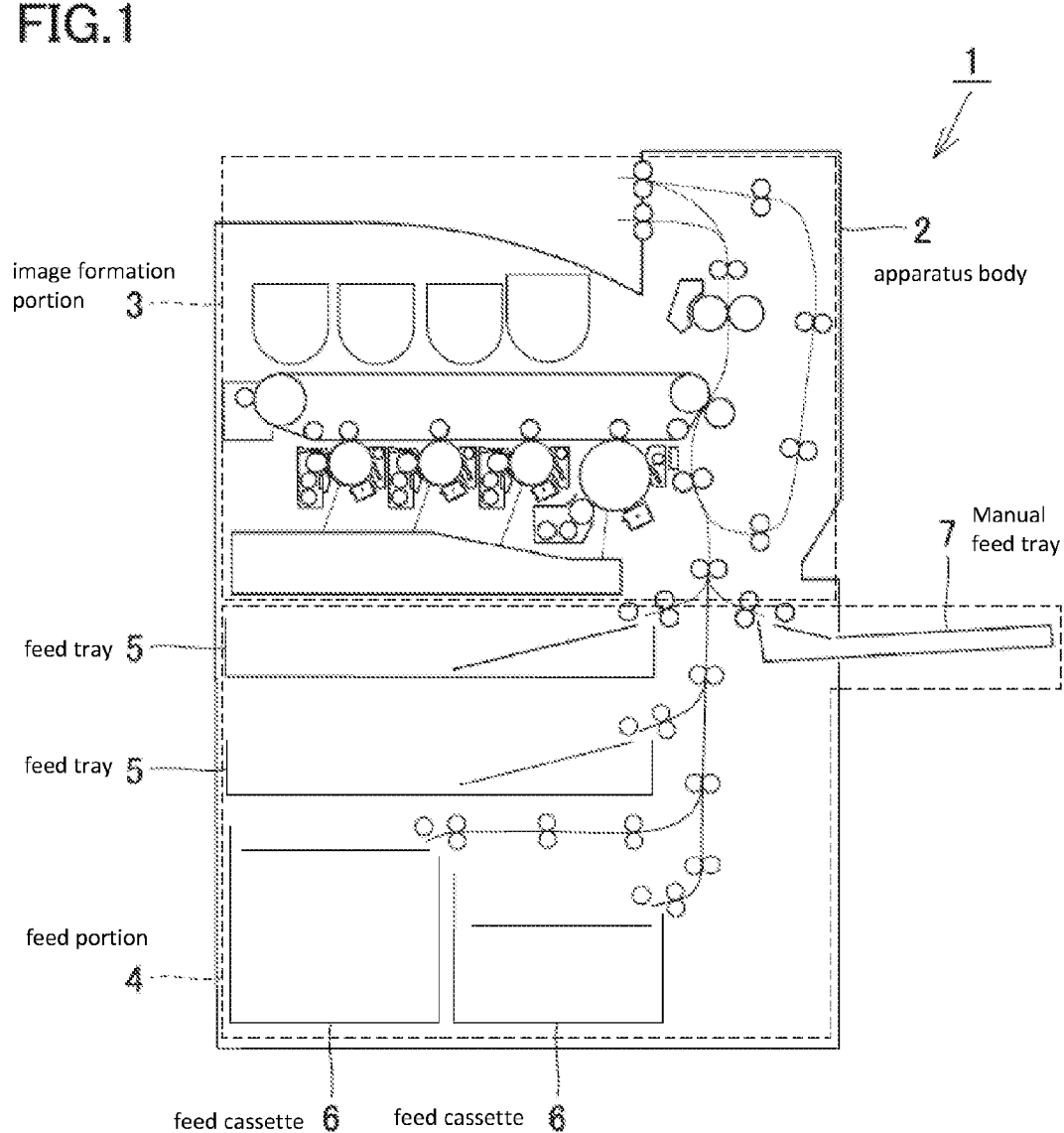
FIG. 1 is a schematic view of an image formation apparatus in an embodiment of the present invention.

Hereinafter, an embodiment of the present invention will be described in detail with reference to the drawings. It is to be noted that, in the embodiment described below, identical or common parts will be designated by the same reference numerals in the drawings, and the description thereof will not be repeated.

Figure 2:
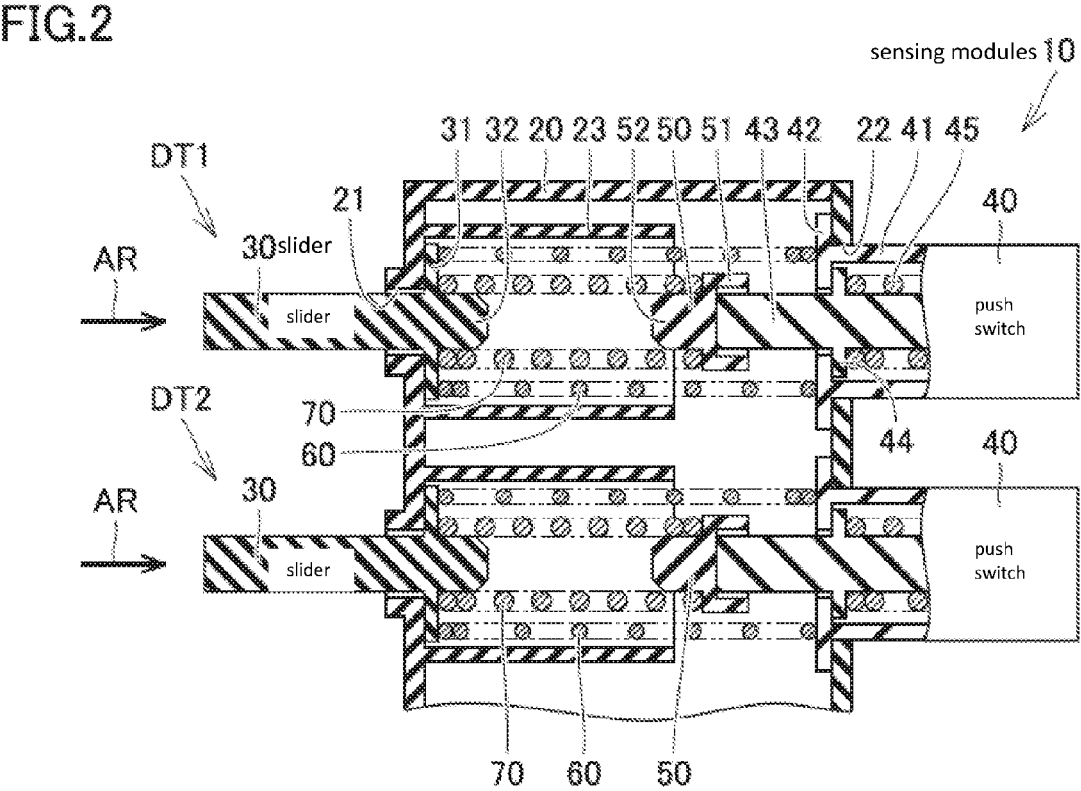
FIG. 2 is a cross sectional view of a main portion of a sensing module provided to the image formation apparatus shown in FIG. 1.

FIG. 1 is a schematic view of an image formation apparatus in an embodiment of the present invention, and FIG. 2 is a cross sectional view of a main portion of a sensing module provided to the image formation apparatus shown in FIG. 1. First, a configuration of an image formation apparatus 1 in the present embodiment will be described with reference to FIGS. 1 and 2. It is to be noted that image formation apparatus 1 illustrated in the present embodiment is a color copying machine which adopts the electrophotographic system.

As shown in FIG. 1, image formation apparatus 1 mainly includes an apparatus body 2, and paper feed trays 5 and paper feed cassettes 6 as a paper feed unit. Apparatus body 2 includes an image formation portion 3 as a portion for forming an image on paper, and a paper feed portion 4 as a portion for feeding the paper to image formation portion 3.

Both paper feed trays 5 and paper feed cassettes 6 house paper to be fed to image formation portion 3, and are detachably provided to paper feed portion 4. Here, the expression "detachably provided" includes a case where paper feed trays 5 and paper feed cassettes 6 are configured to be completely removable from apparatus body 2, and a case where paper feed trays 5 and paper feed cassettes 6 are configured to be drawable from apparatus body 2. It is to be noted that, as shown, paper feed portion 4 may be additionally provided with a manual feed tray 7 for feeding paper to image formation portion 3.

Sensing modules 10 (not shown in FIG. 1, see FIG. 2) are provided at a back position of apparatus body 2 along a direction in which paper feed trays 5 and paper feed cassettes 6 are mounted. Sensing modules 10 are provided in number corresponding to the total number of paper feed trays 5 and paper feed cassettes 6, and installed respectively corresponding to paper feed trays 5 and paper feed cassettes 6, at the back thereof, in a fixed manner (that is, in a manner in which sensing modules 10 do not relatively move with respect to apparatus body 2).

As shown in FIG. 2, each of sensing modules 10 has a plurality of sensing portions DT1, DT2, . . . , and the plurality of sensing portions DT1, DT2, . . . are arranged for example along a predetermined direction. Each of the plurality of sensing portions DT1, DT2, senses presence or absence of depression toward a direction indicated by an arrow AR in the drawing, which is a direction in which paper feed tray 5 or paper feed cassette 6 is mounted on apparatus body 2. Since sensing modules 10 are installed at the back position of apparatus body 2 along the direction in which paper feed trays 5 and paper feed cassettes 6 are mounted as described above, each sensing portion can individually sense whether or not it is depressed by paper feed tray 5 or paper feed cassette 6.

Each of these plurality of sensing modules 10 senses the type of the paper housed in paper feed tray 5 or paper feed cassette 6, based on combination of presence or absence of depression in the plurality of sensing portions DT1, DT2, . . . included therein. Here, the type of the paper to be sensed includes at least one piece of information selected from the size of the paper, the orientation of the paper, and the like.

Here, these plurality of sensing portions DT1, DT2 are held by a common holder 20, and each of them has a basically identical configuration. Accordingly, in the following, a description will be given focusing on one sensing portion DT, without distinction of the plurality of sensing portions DT1, DT2, . . . .

Sensing portion DT includes a slider 30 and a push switch 40 which are assembled on holder 20 to face each other, and a coupling member 50, a first elastic body 60, and a second elastic body 70 which are housed inside holder 20 to be located between slider 30 and push switch 40. Here, slider 30 is arranged to be inserted through a first opening 21 provided in a front surface of holder 20, and push switch 40 is arranged to be inserted through a second opening 22 provided in a back surface of holder 20.

Slider 30 is formed of, for example, a substantially cylindrical member made of a resin or a metal, and is arranged such that an axial direction thereof matches the direction indicated by arrow AR in the drawing as the mounting direction of paper feed tray 5 or paper feed cassette 6 described above. Slider 30 has a collar portion 31 provided on its peripheral surface at a predetermined position in the axial direction to protrude radially outwardly, and a protruding portion 32 protruding toward push switch 40 is located at a position behind collar portion 31.

Slider 30 is inserted through first opening 21 described above from the inside of holder 20. Thus, collar portion 31 described above abuts on an inner surface of holder 20, and thereby forward movement thereof is restricted by holder 20.

It is to be noted that protruding portion 32 described above is located inside holder 20 to face a back side on which push switch 40 is located.

Push switch 40 is formed of, for example, a momentary tactile switch which is turned on only when it is depressed, and is arranged such that an axial direction thereof (that is, depression direction) matches the direction indicated by arrow AR in the drawing as the mounting direction of paper feed tray 5 or paper feed cassette 6 described above. Push switch 40 has a casing 41, a switch portion 43 protruding forward from casing 41, and a third elastic body 45 housed inside casing 41.

Casing 41 is formed of, for example, a member made of a resin or a metal, and has a flange portion 42 provided at a tip portion thereof to protrude outwardly. Switch portion 43 is formed of, for example, a substantially cylindrical member made of a resin or a metal, and is arranged such that an axial direction thereof matches the direction indicated by arrow AR in the drawing as the mounting direction of paper feed tray 5 or paper feed cassette 6 described above. Switch portion 43 has a collar portion 44 provided on its peripheral surface at a predetermined position in the axial direction to protrude radially outwardly.

Further, third elastic body 45 is formed of, for example, a coil spring made of a metal or a resin roughly formed in the shape of a cylinder, and one end portion thereof in an axial direction abuts on collar portion 44. Thereby, switch portion 43 is elastically biased forward by the elastic biasing force of third elastic body 45, and is held to be slidingly movable along the direction indicated by arrow AR in the drawing as the mounting direction of paper feed tray 5 or paper feed cassette 6.

Push switch 40 is inserted through second opening 22 described above from the inside of holder 20. Thus, flange portion 42 described above abuts on an inner surface of holder 20, and thereby movement thereof toward the axial direction is restricted by holder 20. Here, unlike slider 30 described above, push switch 40 is preferably fixed to be relatively unmovable with respect to holder 20. It is to be noted that switch portion 43 described above is located inside holder 20 to face a front side on which slider 30 is located.

Coupling member 50 is formed of, for example, a cup-shaped member made of a resin or a metal, and is arranged to cover a tip portion of switch portion 43 of push switch 40. Coupling member 50 has a bottomed cylindrical cover portion 51 covering the tip portion of switch portion 43, and a protruding portion 52 protruding forward from a bottom portion of cover portion 51. Protruding portion 52 is located to face protruding portion 32 of slider 30 described above.

First elastic body 60 is formed of, for example, a coil spring made of a metal or a resin roughly formed in the shape of a cylinder, and is housed inside holder 20 to be interposed between slider 30 and push switch 40. More specifically, one end portion of first elastic body 60 in an axial direction abuts on collar portion 31 of slider 30, and the other end portion thereof in the axial direction abuts on flange portion 42 of push switch 40, such that the axial direction thereof matches the direction indicated by arrow AR in the drawing as the mounting direction of paper feed tray 5 or paper feed cassette 6 described above. Here, first elastic body 60 is assembled with being slightly compressed in the axial direction by slider 30 and push switch 40.

Second elastic body 70 is formed of, for example, a coil spring made of a metal or a resin roughly formed in the shape of a cylinder, and is located between slider 30 and coupling member 50 to be interposed between slider 30 and switch portion 43 of push switch 40. More specifically, one end portion of second elastic body 70 in an axial direction is externally inserted onto protruding portion 32 of slider 30 to be fixed on slider 30, and the other end portion thereof in the axial direction is externally inserted onto protruding portion 52 of coupling member 50 to be fixed on coupling member 50, such that the axial direction thereof matches the direction indicated by arrow AR in the drawing as the mounting direction of paper feed tray 5 or paper feed cassette 6 described above. It is to be noted that, although second elastic body 70 may be assembled with being slightly compressed in the axial direction by slider 30 and coupling member 50, to an extent in which push switch 40 is not turned on, second elastic body 70 here is assembled in a free state, without being slightly compressed.

Here, the outer diameter of second elastic body 70 is configured to be smaller than the inner diameter of first elastic body 60, and thereby, second elastic body 70 is housed inside first elastic body 60. Further, the inner diameter of first elastic body 60 is configured to be larger than each of the outer diameter of switch portion 43 of push switch 40 and the outer diameter of coupling member 50, and thereby, switch portion 43 of push switch 40 and coupling member 50 are each housed inside first elastic body 60. With such a configuration, sensing portion DT can be configured to have a sufficiently small outer shape.

It is to be noted that, as shown, a cylindrical guide portion 23 is preferably provided at a predetermined position of holder 20 to surround first elastic body 60. With such a configuration, possible drop-off of first elastic body 60 can be prevented.

In sensing portion DT configured as described above, slider 30 is elastically biased forward by the elastic biasing force (that is, restoring force) of first elastic body 60, and when a portion located to protrude forward from slider 30 is depressed by paper feed tray 5 or paper feed cassette 6 in the direction indicated by arrow AR in the drawing, slider 30 recedes against the elastic biasing force described above. That is, slider 30 is held to be slidingly movable, mainly by first elastic body 60.

Here, in image formation apparatus 1 in the present embodiment, since sensing portion DT has first elastic body 60 described above and also has second elastic body 70 interposed between slider 30 and switch portion 43 of push switch 40, sensing portion DT can stably sense presence or absence of depression of switch portion 43 of push switch 40 when paper feed tray 5 or paper feed cassette 6 is mounted on apparatus body 2. As a result, a stable operation can be achieved without causing paper jam, breakage of push switch 40, and the like.

This achievement is attributed to the fact that, by adopting the above configuration, the movable stroke of switch portion 43 of push switch 40 can be configured to be relatively small (narrow), and at the same time, the movable stroke of slider 30 in a range corresponding thereto can be extended (that is, widened) more than the movable stroke of switch portion 43, and thereby, the extended movable stroke of slider 30 can absorb dimensional tolerances of various components constituting image formation apparatus 1, variations in the accuracy of positions of assembling these components, and the like. Hereinafter, the detail thereof will be described.

Figure 3:
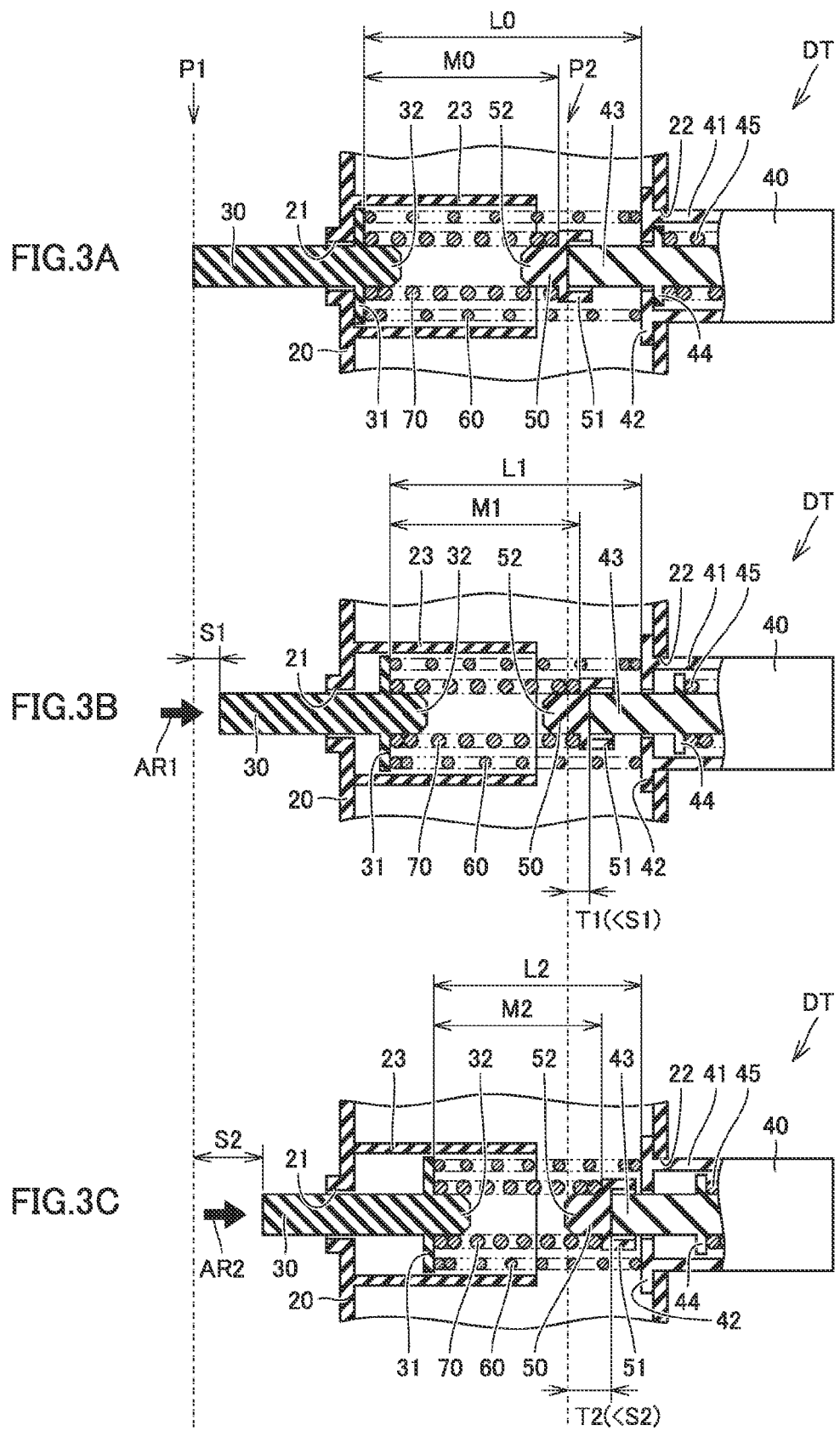
FIGS. 3A to 3C are schematic cross sectional views showing a sensing operation of a sensing portion shown in FIG. 2.

FIGS. 3A to 3C are schematic cross sectional views showing a sensing operation of the sensing portion shown in FIG. 2. Hereinafter, referring to FIGS. 3A to 3C, a sensing operation of sensing portion DT will be described, and the reason why the above effect can be obtained will be described in detail. It is to be noted that FIGS. 3A to 3C show the sensing operation of sensing portion DT step by step in chronological order. In particular, FIG. 3B shows timing at which push switch 40 is turned on by depressing switch portion 43 of push switch 40, and FIG. 3C shows a state where paper feed tray 5 or paper feed cassette 6 is completely mounted on apparatus body 2.

As shown in FIG. 3A, in a state where paper feed tray 5 or paper feed cassette 6 is not mounted on apparatus body 2, slider 30 is in a state where it is elastically biased forward by the elastic biasing force of first elastic body 60, as described above. Accordingly, slider 30 is located on the forefront side in a range in which it is slidingly movable, and its tip portion located on the front side is arranged at an origin position P1 shown in the drawing. Further, in that state, switch portion 43 of push switch 40 is not in a depressed state either, and its tip portion located on the front side is arranged at an origin position P2 shown in the drawing.

Here, axial direction lengths of first elastic body 60 and second elastic body 70 in the state shown in FIG. 3A are defined as L0 and M0, respectively. It is to be noted that axial direction length L0 of first elastic body 60 is an axial direction length in a state where first elastic body 60 is slightly compressed by collar portion 31 of slider 30 and flange portion 42 of push switch 40, and axial direction length M0 of second elastic body 70 is a natural length obtained when second elastic body 70 is in a free state.

As shown in FIG. 3B, as paper feed tray 5 or paper feed cassette 6 is mounted on apparatus body 2, paper feed tray 5 or paper feed cassette 6 comes into contact with the tip portion of slider 30 of sensing portion DT, and paper feed tray 5 or paper feed cassette 6 is further pushed along the mounting direction to cause slider 30 to slidingly move by an arrow AR1. In this state, first elastic body 60 is compressed in accordance with a moving amount S1 of slider 30, and the axial direction length of first elastic body 60 changes to L1 smaller than L0 described above.

On that occasion, second elastic body 70 and third elastic body 45 are also compressed by the movement of slider 30, and the axial direction length of second elastic body 70 changes to M1 smaller than M0 described above. On this occasion, positions of switch portion 43 and coupling member 50 held with being sandwiched between second elastic body 70 and third elastic body 45 are determined based on the relation between the elastic biasing force of second elastic body 70 and the elastic biasing force of third elastic body 45. A portion of a force acting on switch portion 43 of push switch 40 via second elastic body 70 and coupling member 50 is absorbed by second elastic body 70 as a force required to compress second elastic body 70, and a moving amount T1 of switch portion 43 is relatively smaller than moving amount S1 of slider 30.

It is to be noted that, as described above, push switch 40 enters an ON state by depressing switch portion 43 of push switch 40 by a predetermined amount in this state (that is, moving amount T1 of switch portion 43 in this state).

As shown in FIG. 3C, paper feed tray 5 or paper feed cassette 6 is further pushed along the mounting direction from the state shown in FIG. 3B to cause slider 30 to slidingly move by an arrow AR2, and thereby paper feed tray 5 or paper feed cassette 6 is completely mounted on apparatus body 2. In this state, first elastic body 60 is compressed in accordance with a moving amount S2 of slider 30, and the axial direction length of first elastic body 60 changes to L2 further smaller than L1 described above.

On that occasion, second elastic body 70 and third elastic body 45 are also further compressed by the further movement of slider 30, and the axial direction length of second elastic body 70 changes to M2 further smaller than M1 described above. On this occasion, positions of switch portion 43 and coupling member 50 held with being sandwiched between second elastic body 70 and third elastic body 45 are also determined based on the relation between the elastic biasing force of second elastic body 70 and the elastic biasing force of third elastic body 45. A portion of a force acting on switch portion 43 of push switch 40 via second elastic body 70 and coupling member 50 is absorbed by second elastic body 70 as a force required to compress second elastic body 70, and a moving amount T2 of switch portion 43 is also relatively smaller than moving amount S2 of slider 30.

Accordingly, by adopting the above configuration, a portion of a force to act on switch portion 43 of push switch 40 by the movement of slider 30 is absorbed by second elastic body 70 as a force required to compress second elastic body 70. Thereby, the movable stroke of switch portion 43 of push switch 40 can be configured to be relatively small, and at the same time, the movable stroke of slider 30 in the range corresponding thereto can be extended more than the movable stroke of switch portion 43.

Therefore, the extended movable stroke of slider 30 can absorb dimensional tolerances of various components constituting image formation apparatus 1, variations in the accuracy of positions of assembling these components, and the like. Thus, presence or absence of depression of switch portion 43 of push switch 40 can be stably sensed when paper feed tray 5 or paper feed cassette 6 is mounted on apparatus body 2, and as a result, a stable operation can be achieved without causing paper jam, breakage of push switch 40, and the like.

Here, the elastic biasing force (restoring force) of second elastic body 70 is preferably configured to be greater than the elastic biasing force (restoring force) of first elastic body 60, and the elastic biasing force (restoring force) of second elastic body 70 is preferably configured to be greater than the elastic biasing force (restoring force) of third elastic body 45. With such a configuration, extension of the movable stroke of slider 30 with respect to the movable stroke of switch portion 43 described above can be set appropriately.

In order to increase the elastic biasing force of second elastic body 70 to be greater than the elastic biasing force of first elastic body 60 and the elastic biasing force of third elastic body 45, in a case where first elastic body 60, second elastic body 70, and third elastic body 45 are each formed of a coil spring, it is only necessary to adjust these elastic biasing forces by adopting different materials, wire diameters, winding diameters, winding pitches, and the like, as appropriate. In particular, it is only necessary to set the elastic biasing force of first elastic body 60 to a force enough to allow slider 30 located at a receding position as paper feed tray 5 or paper feed cassette 6 is mounted on apparatus body 2, to return to origin position P1 described above.

It is to be noted that, although the above description has illustrated the case where first elastic body 60 and second elastic body 70 are each formed of a coil spring, these can also be each formed of, for example, a cushion member made of a rubber or a sponge.

Further, although the above description has been given for the case where the end portion of first elastic body 60 located on the push switch 40 side is caused to abut on flange portion 42 of push switch 40, such an end portion of first elastic body 60 may be caused to abut on any portion which does not relatively move with respect to apparatus body 2 (for example, such as holder 20 for sensing module 10).

Figure 4:
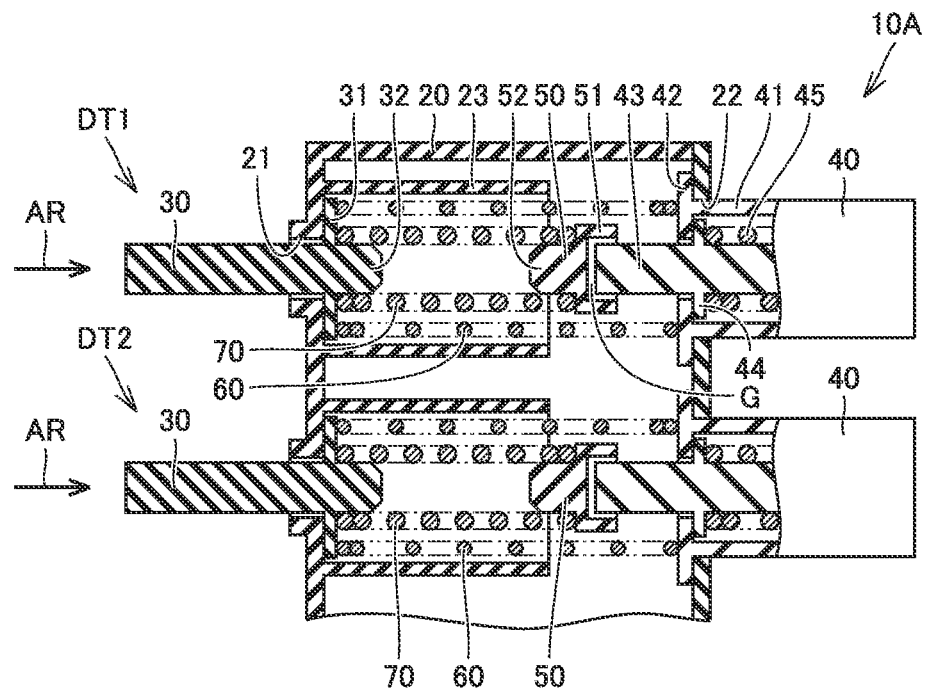
FIG. 4 is a cross sectional view of a main portion of a sensing module in accordance with a first variation.

FIG. 4 is a cross sectional view of a main portion of a sensing module in accordance with a first variation. Hereinafter, a sensing module 10A in accordance with the first variation will be described with reference to FIG. 4.

As shown in FIG. 4, when compared with sensing module 10 described above, sensing module 10A in accordance with the first variation is different from sensing module 10 only in that a gap G is provided between switch portion 43 of push switch 40 and coupling member 50. Gap G is produced in a state where paper feed tray 5 or paper feed cassette 6 is removed from apparatus body 2.

This gap G can be formed because coupling member 50 is held by second elastic body 70, with one end portion of second elastic body 70 in the axial direction being fixed on protruding portion 32 of slider 30, and the other end portion of second elastic body 70 in the axial direction being fixed on protruding portion 52 of coupling member 50. Here, gap G is set to have a size in a range in which the state where switch portion 43 of push switch 40 fits into cover portion 51 of coupling member 50 is always maintained.

With such a configuration, when paper feed tray 5 or paper feed cassette 6 is mounted on apparatus body 2, second elastic body 70 and coupling member 50 move together with slider 30, with their shapes being maintained, after paper feed tray 5 or paper feed cassette 6 comes into contact with the tip portion of slider 30 of sensing portion DT, until coupling member 50 comes into contact with switch portion 43. Therefore, timing at which second elastic body 70 starts being compressed can be delayed, and the extension of the movable stroke of slider 30 with respect to the movable stroke of switch portion 43 can be further enhanced.

Figure 5:
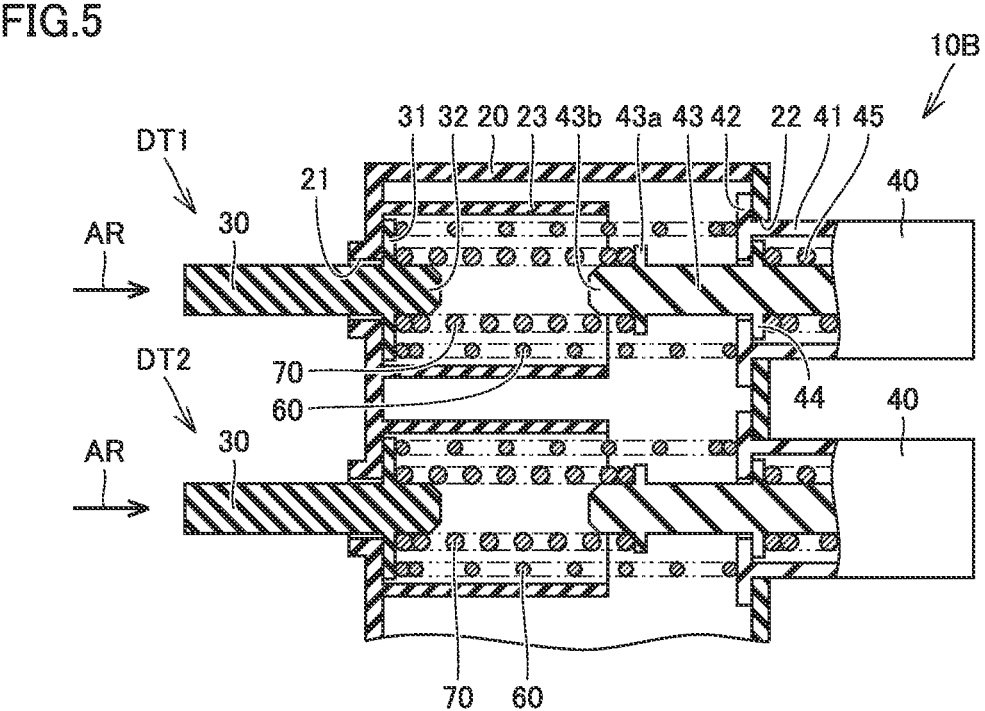
FIG. 5 is a cross sectional view of a main portion of a sensing module in accordance with a second variation.

FIG. 5 is a cross sectional view of a main portion of a sensing module in accordance with a second variation. Hereinafter, a sensing module 10B in accordance with the second variation will be described with reference to FIG. 5.

As shown in FIG. 5, when compared with sensing module 10 described above, sensing module 10B in accordance with the second variation is different from sensing module 10 in that sensing module 10B does not have coupling member 50. Consequently, the configuration of switch portion 43 of push switch 40 is different from that of sensing module 10 described above.

Specifically, switch portion 43 of push switch 40 has a collar portion 43a provided on its peripheral surface at a predetermined position in the axial direction to protrude radially outwardly, and a protruding portion 43b protruding toward slider 30 is located at a position in front of collar portion 43a. Further, one end portion of second elastic body 70 in the axial direction is externally inserted onto protruding portion 32 of slider 30 to be fixed on slider 30, and the other end portion thereof in the axial direction is externally inserted onto protruding portion 43b of switch portion 43 to be fixed on switch portion 43.

Also with such a configuration, the movable stroke of switch portion 43 of push switch 40 can be configured to be relatively small, and at the same time, the movable stroke of slider 30 in the range corresponding thereto can be extended more than the movable stroke of switch portion 43, as in the case of sensing module 10 described above.

Although the description has been given in the embodiment and its variations of the present invention described above for the case where the present invention is applied to a sensing module which senses the type of paper, it is also naturally possible to apply the present invention to a sensing module which only senses presence or absence of mounting of a paper feed unit, and the like.

Further, although the description has been given in the embodiment and its variations of the present invention described above for the case where the present invention is applied to a color copying machine which adopts the electrophotographic system, the application target of the present invention is not limited thereto. The present invention is applicable to any image formation apparatus including a paper feed unit such as a paper feed tray and a paper feed cassette, and is particularly suitably applicable to a copying machine, a printer, a facsimile, or the like provided with an image formation portion which forms an image utilizing the electrophotographic system, irrespective of the type such as color/monochrome images.

Although the embodiment of the present invention has been described, it should be understood that the embodiment disclosed herein is illustrative and non-restrictive in every respect. The scope of the present invention is defined by the scope of the claims, and is intended to include any modifications within the scope and meaning equivalent to the scope of the claims.

What is claimed is:

1. An image formation apparatus, comprising:
    an apparatus body which includes an image formation portion forming an image on paper and a paper feed portion feeding the paper to the image formation portion;
    a paper feed unit which is detachably provided to the paper feed portion and houses paper to be fed to the image formation portion; and
    a sensing portion which is provided to the apparatus body and senses presence or absence of depression by the paper feed unit, wherein
    the sensing portion includes
        a slider which is provided to be slidingly movable along a mounting direction of the paper feed unit, and recedes along the mounting direction when the paper feed unit contacts the slider,
        a push switch arranged behind the slider along the mounting direction,
        a first elastic body arranged to be interposed between the slider and a portion which does not relatively move with respect to the apparatus body, for elastically biasing the slider toward a direction away from the push switch, and
        a second elastic body arranged to be interposed between the slider and a switch portion of the push switch, for elastically biasing the slider toward the direction away from the push switch.

2. The image formation apparatus according to claim 1, wherein an elastic biasing force of the second elastic body is greater than an elastic biasing force of the first elastic body.

3. The image formation apparatus according to claim 1, wherein
    the push switch has a third elastic body for elastically biasing the switch portion toward the slider, and
    an elastic biasing force of the second elastic body is greater than an elastic biasing force of the third elastic body.

4. The image formation apparatus according to claim 1, wherein
    the sensing portion further includes a coupling member arranged between the switch portion and the slider to cover a tip of the switch portion, and the second elastic body is arranged between the coupling member and the slider.

5. The image formation apparatus according to claim 4, wherein a gap is provided between the switch portion and the coupling member, in a state where the paper feed unit is removed from the apparatus body.

6. The image formation apparatus according to claim 1, wherein
- each of the first elastic body and the second elastic body is formed of a cylindrical member, and
- the second elastic body is housed inside the first elastic body.

7. The image formation apparatus according to claim 1, wherein
- a plurality of the sensing portions are provided to the apparatus body, and
- a type of the paper housed in the paper feed unit is detected based on combination of presence or absence of depression in each of the plurality of sensing portions.

* * * * *